US 7,908,641 B2

(12) United States Patent
Fischer

(10) Patent No.: US 7,908,641 B2
(45) Date of Patent: Mar. 15, 2011

(54) MODULAR EXPONENTIATION WITH RANDOMIZED EXPONENT

(75) Inventor: Wieland Fischer, Munich (DE)

(73) Assignee: Infineon Technologies AG (DE)

( * ) Notice: Subject to any disclaimer, the term of this patent is extended or adjusted under 35 U.S.C. 154(b) by 1626 days.

(21) Appl. No.: 11/195,350

(22) Filed: Aug. 1, 2005

(65) Prior Publication Data
US 2007/0064930 A1 Mar. 22, 2007

Related U.S. Application Data

(63) Continuation of application No. PCT/EP2004/000522, filed on Jan. 22, 2004.

(30) Foreign Application Priority Data

Feb. 4, 2003 (DE) .................................. 103 04 451

(51) Int. Cl.
*H04L 9/00* (2006.01)
(52) U.S. Cl. .............................. 726/2; 713/174; 708/277
(58) Field of Classification Search .................. 712/1, 8, 712/32; 713/150, 168, 171, 174, 187–189; 726/2–4, 19, 26–27, 30; 705/57–59, 62, 705/67; 380/1, 228–229, 239, 255, 259, 380/37, 277–279, 281–286, 28–30; 358/426.12, 358/434–439; 708/3, 7, 100, 103, 140, 145, 708/146, 160, 164, 168–170, 174, 200, 250, 708/255–257, 277, 306, 446, 490, 501–505, 708/510, 620, 650, 670, 800–802, 835, 851
See application file for complete search history.

(56) References Cited

U.S. PATENT DOCUMENTS

| 4,499,551 | A | * | 2/1985 | Frank ............................ 708/250 |
| 4,611,307 | A | * | 9/1986 | Reach et al. ................... 708/130 |
| 5,046,094 | A | * | 9/1991 | Kawamura et al. ............. 380/46 |
| 5,369,708 | A | * | 11/1994 | Kawamura et al. ............. 380/30 |
| 5,819,289 | A | * | 10/1998 | Sanford et al. ....................... 1/1 |
| 5,991,415 | A |  | 11/1999 | Shamir |
| 6,298,135 | B1 |  | 10/2001 | Messerges et al. |
| 6,304,658 | B1 | * | 10/2001 | Kocher et al. ................... 380/30 |
| 6,769,064 | B2 | * | 7/2004 | Sion et al. ...................... 713/193 |

(Continued)

FOREIGN PATENT DOCUMENTS

DE 198 28 936 A1 12/1999

(Continued)

OTHER PUBLICATIONS

Alfred J. Menezes, et al.; "Handbook of Applied Cryptography"; CRC Press, 1996, Chapter 11.3 (RSA and related signature schemes).

(Continued)

*Primary Examiner* — Kimyen Vu
*Assistant Examiner* — Leynna T Truvan
(74) *Attorney, Agent, or Firm* — Dickstein Shapiro LLP

(57) ABSTRACT

For the determination of a result of a modular exponentiation, a randomization auxiliary number is employed for the randomization of the exponent on the basis of the product of the public key and the private key less "1". This randomization auxiliary number may be derived from the private RSA dataset without special functionalities. Thus, low-overhead exponent randomization may be performed for each security protocol universally, to perform a digital signature secure against side-channel attacks.

19 Claims, 6 Drawing Sheets

U.S. PATENT DOCUMENTS

| | | | |
|---|---|---|---|
| 6,892,940 B2 * | 5/2005 | Kocarev et al. | 235/380 |
| 6,907,407 B1 * | 6/2005 | Yamanoue et al. | 705/57 |
| 6,914,983 B2 * | 7/2005 | Chen et al. | 380/28 |
| 6,928,163 B1 * | 8/2005 | Matyas et al. | 380/30 |
| 6,956,341 B2 * | 10/2005 | Nakai et al. | 318/400.01 |
| 6,957,341 B2 * | 10/2005 | Rice et al. | 713/190 |
| 6,973,190 B1 * | 12/2005 | Goubin | 380/263 |
| 7,080,262 B2 * | 7/2006 | Benaloh | 713/193 |
| 7,248,700 B2 * | 7/2007 | Seifert et al. | 380/282 |

FOREIGN PATENT DOCUMENTS

| | | |
|---|---|---|
| DE | 100 42 234 A1 | 3/2002 |
| DE | 100 42-234 C2 | 3/2002 |
| EP | 0 872 795 A1 | 10/1998 |
| EP | 1 128 599 A1 | 8/2001 |
| EP | 1 239 365 A2 | 9/2002 |
| GB | 2 254 743 A | 10/1992 |

OTHER PUBLICATIONS

Walter, Colin D., et al.; "Some Security Aspects of the Mist Randomized Exponentiation Algorithm"; CHES 2002, LNCS, vol. 2523, Springer-Verlag 2002, pp. 276-290.

ChangKyun Kim et al.; "Power Attack Resistant Countermeasure using Random Separation of Scalar Multiplication Method for ECC".

G. A. Ruiz; "Compact four bit carry look ahead CMOS adder in multi-output DCVS logic" Electronics Letters, vol. 32, No. 17, Aug. 15, 1996.

G.A. Ruiz et al; "Compact 32-bit CMOS adder in multiple-output DCVS logic for self-timed circuits"; IEE Proceedings—Circuits Devices and Systems, vol. 147, No. 3, Jun. 2000, pp. 183-188.

* cited by examiner

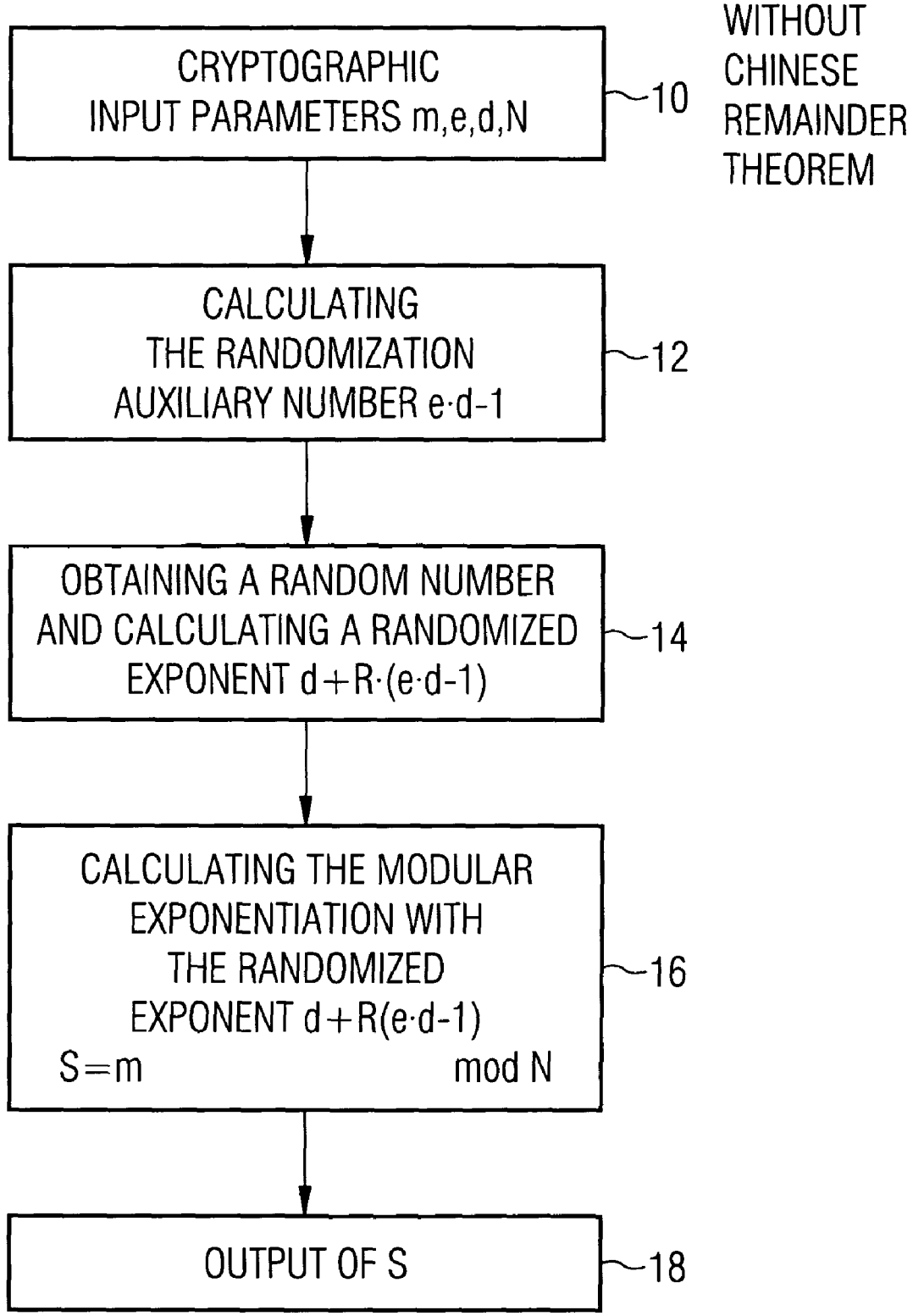

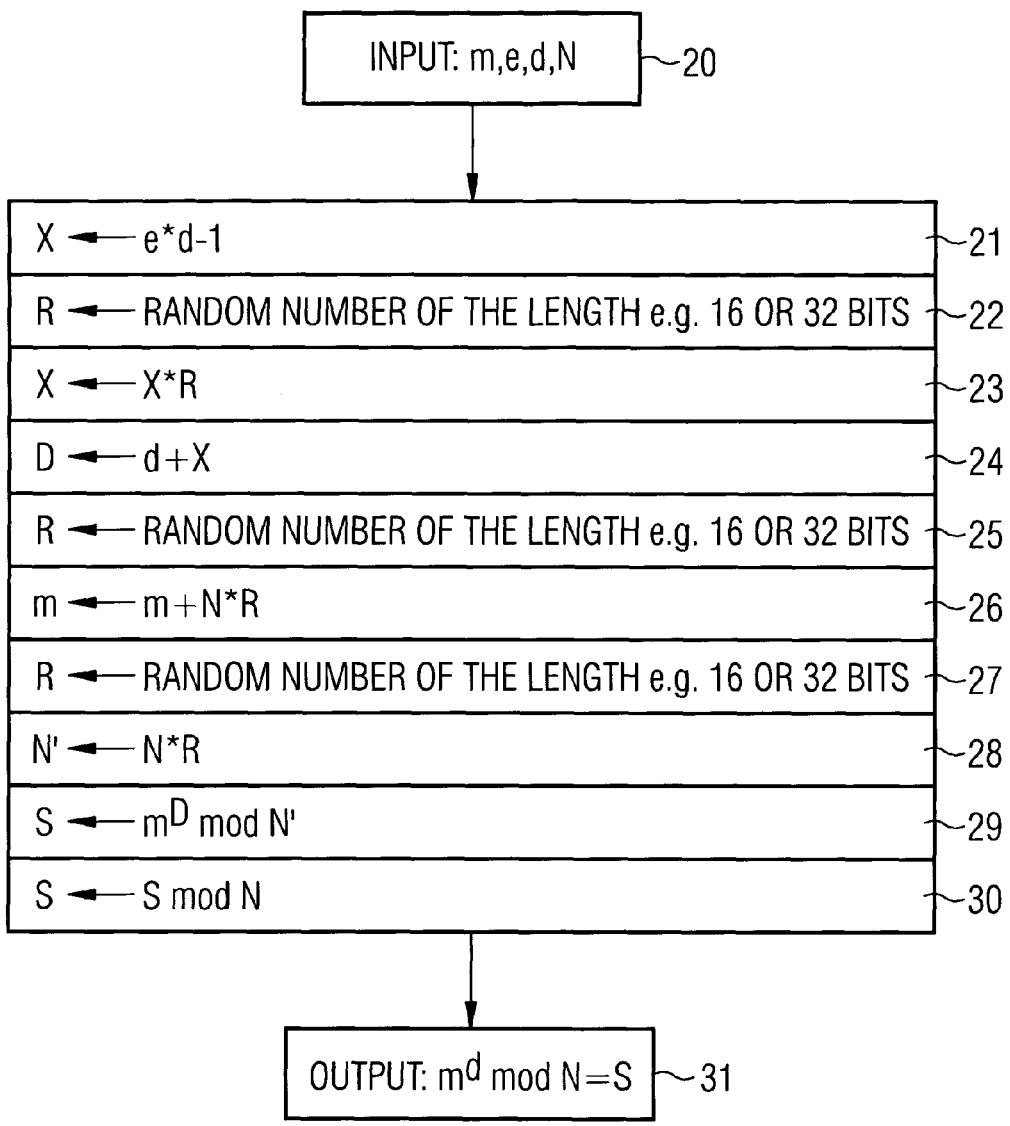

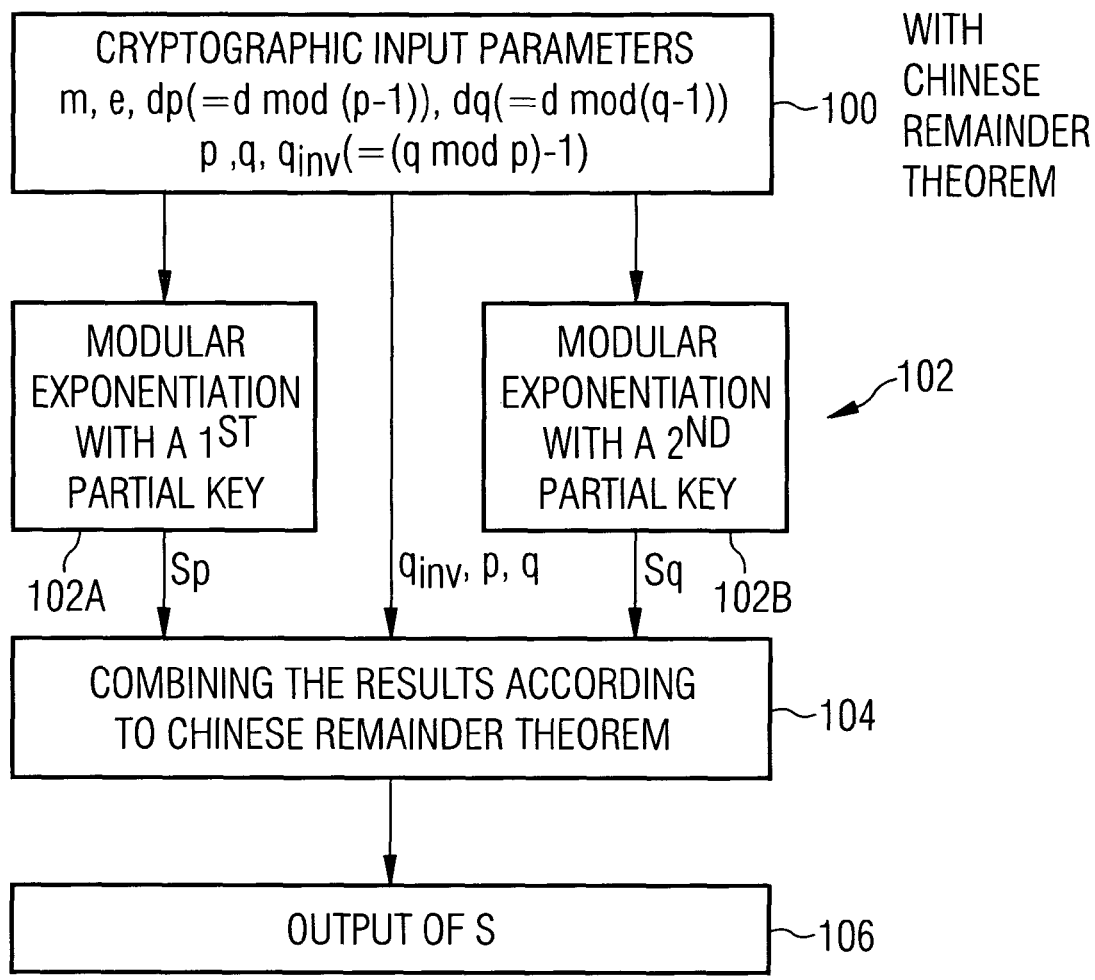

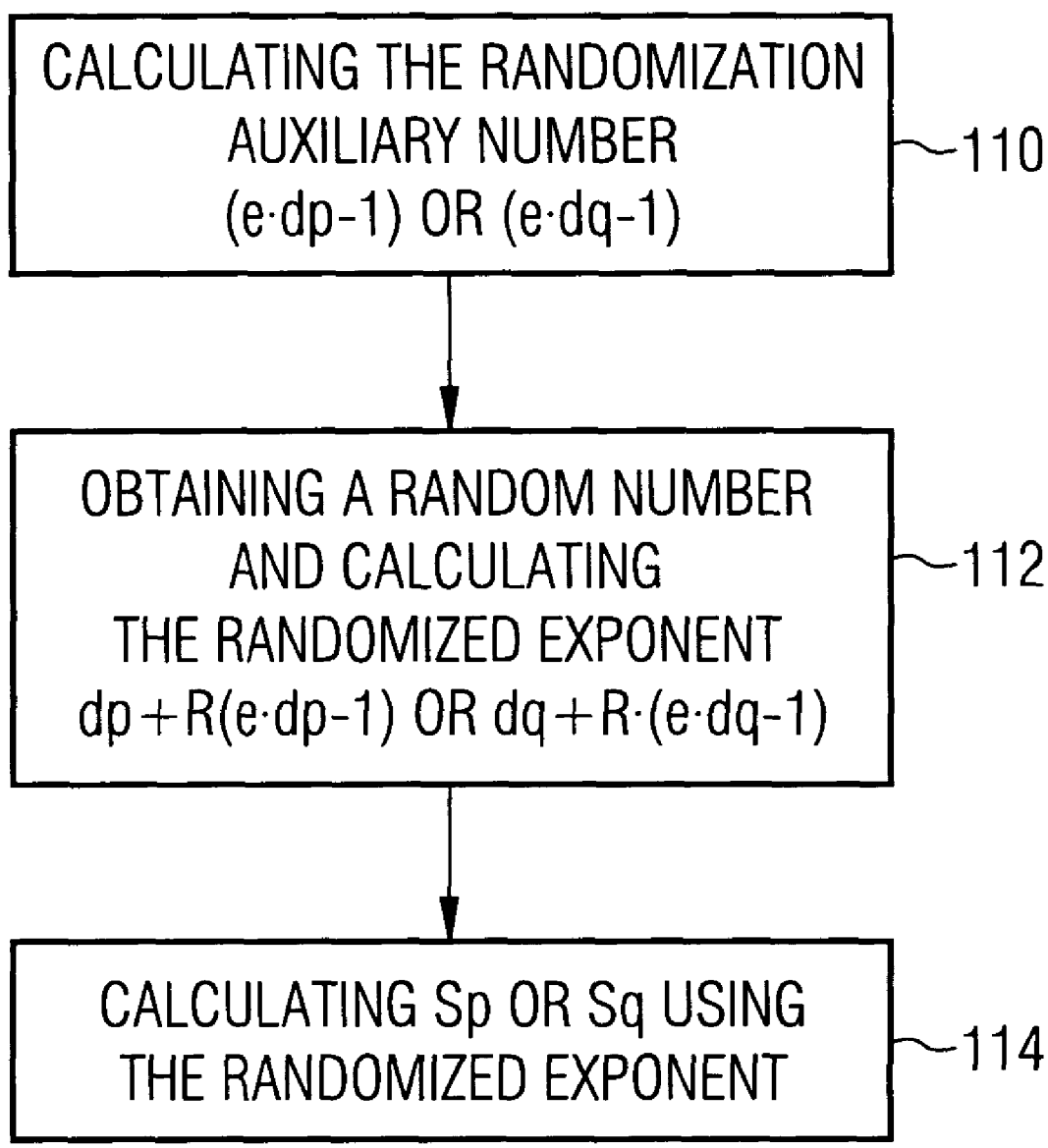

FIG 5A

| | |
|---|---|
| X ← $e*d_p - 1$ | 120 |
| R ← RANDOM NUMBER OF THE LENGTH e.g. 16 OR 32 BITS | 122 |
| X ← X*R | 124 |
| D ← $d_p + X$ | 126 |
| R ← RANDOM NUMBER OF THE LENGTH e.g. 16 OR 32 BITS | 128 |
| m' ← m + p*R | 130 |
| R ← RANDOM NUMBER OF THE LENGTH e.g. 16 OR 32 BITS | 132 |
| p' ← p*R | 134 |
| Sp ← $m'^D \bmod p'$ | 136 |
| Sp ← Sp mod p | 138 |

FIG 5B

| | |
|---|---|
| X ← $e*d_q - 1$ | 140 |
| R ← RANDOM NUMBER OF THE LENGTH e.g. 16 OR 32 BITS | 142 |
| X ← X*R | 144 |
| D ← $d_q + X$ | 146 |
| R ← RANDOM NUMBER OF THE LENGTH e.g. 16 OR 32 BITS | 148 |
| m' ← m + q*R | 150 |
| R ← RANDOM NUMBER OF THE LENGTH e.g. 16 OR 32 BITS | 152 |
| q' ← q*R | 154 |
| Sq ← $m'^D \bmod q'$ | 156 |
| Sq ← Sq mod q | 158 |

FIG 5C $$S \leftarrow Sq + (((Sp-Sq) * qinv) \bmod p) * q$$

FIG 6   PRIOR ART

SIGNATURE: $S = m^d \bmod N$ — 60

S: SIGNATURE
d: SECRET KEY
N: MODULUS
e: PUBLIC KEY

VERIFICATION: $m' = S^e \bmod N$
$m' = m?$ — 62

MODULAR EXPONENTIATION WITH RANDOMIZED EXPONENT

CROSS-REFERENCE TO RELATED APPLICATION

This application is a continuation of co-pending International Application No. PCT/EP04/00522, filed Jan. 22, 2004, which designated the United States and was not published in English and is incorporated herein by reference in its entirety.

BACKGROUND OF THE INVENTION

1. Field of the Invention

The present invention relates to cryptographic systems, and in particular to apparatus and methods for determining a result of a modular exponentiation within a cryptosystem.

2. Description of the Related Art

Particularly in algorithms for the digital signature or also in other cryptographic applications, it is necessary to protect secret data, such as a private key of the RSA algorithm, from so-called side-channel attacks. Such attacks are based on an analysis of the current, power, or radiation profile of a circuit processing the algorithm. On the basis of an evaluation of such a power profile of the circuit it is possible to make statements about the secret key.

The basic concept of the digital signature on the basis of the RSA algorithm is illustrated on the basis of FIG. 6, as it is described in the "Handbook of Applied Cryptography" by Menezes, van Oorschot, Vanstone, CRC Press, 1996, chapter 11.3. For executing the digital signature 60, an entity A signs a message m. Thereby, each entity B may verify the signature of the entity A and recover the message m from the signature.

In the signature generation, as it is illustrated at 60 in FIG. 6, the entity A calculates the modular exponentiation with the basis m for the signature, with the secret key d and the modulus N according to the equation illustrated in block 60. As it is known, a public key e required by an entity B for verification, as it is illustrated at 62 in FIG. 6, belongs to the secret key d. The entity B takes the public key e belonging to d as exponent and exponentiates the signature S generated by the entity A with the public key. After a concluding reduction with reference to the modulus N, a verified message m' results. If the non-signed message has been known to the entity B, it may determine whether the signature S in fact originated from the entity A or not due to a comparison of m' and m. In other words, it means that the entity B may determine whether the private key d used for the signature in fact belongs to the public key e. If the entity B, for other reasons, knows that the entity A is authentic, the verification, i.e. the modular exponentiation of the signature with the public key as exponent, immediately yields the message m, since the second condition at 62 in FIG. 6 is then certainly met.

An attacker might wish to determine the secret key d of the entity A, which is used for the signature at 60 in FIG. 6. To this end, the attacker could perform a power analysis or a similar side-channel attack. For warding off such an attack on the basis of a statistical side-channel attack (DPA, EMA), usually randomization e.g. of the exponent is employed in the RSA signature establishment. $s=m^d \bmod N$ is to be replaced by $s=m^{d'} \bmod N$, with the result supposed to be the same, but the exponent d' different in each calculation with the same key d. In general, the secret key in the RSA algorithm consists of the pair (d, N). The public key consists of the pair (e, N). Typically, the modulus is known so that the only secret information is the exponent d. Furthermore, it is known that the product of d and e satisfies the following equation:

$$d \times e = 1 \bmod \lambda(N)$$

$\lambda(N)$ is the known Carmichael function. Thus, the randomized exponent cannot be arbitrary. Hence, usually a multiple of the Carmichael function $\lambda(N)$ is required for the randomization of the exponent. But usually this is not given.

Furthermore, it is known to use the Chinese remainder theorem (CRT) for the signature establishment, which is also described in the Handbook of Applied Cryptography in chapter 14.5. In particular, a special form of the CRT is used, which is known by the designation of Garner's algorithm. The Chinese remainder theorem serves to put down the entire exponentiation to two exponentiations modulo p and q. The Chinese remainder theorem is particularly interesting since the two exponentiations are formed with exponents having only half the length of the original exponents (d or e). It is disadvantageous, however, that the Chinese remainder theorem can only be applied when additional parameters p, q are present, wherein the product of p and q yields the modulus N. For making the signature calculation using the Chinese remainder theorem safe, it is necessary to make both exponentiations safe, i.e. provide them with a randomization, in order to inhibit side-channel attacks. The Carmichael functions read $\lambda(p)=p-1$ and $\lambda(q)=q-1$. These two Carmichael functions, however, have to be specially calculated.

Independent of whether the RSA algorithm is employed with the Chinese remainder theorem or without the Chinese remainder theorem, it is little desirable to employ no randomization of the exponents, since with this a security problem might arise. For this reason, it has been proposed to perform randomization of the exponents using Euler's Phi function phi(N). Randomization using Euler's phi function, however, requires knowledge of phi(N). Normally, phi is not given and thus has to be specially calculated when this randomization method is to be employed.

An alternative procedure consists in using the Carmichael $\lambda$ function $\lambda(N)$, which is smaller with reference to the numerical value, instead of Euler's phi function. This method has the advantage that the randomized exponent becomes shorter at equal security, so that computation time advantages arise as compared with the use of Euler's phi function. It is again disadvantageous in this method that $\lambda(N)$ is required. The Carmichael function $\lambda(N)$ thus has to be specially calculated and is not present a priori.

An alternative randomization consists in the randomized exponent being split in two exponents. This has the advantage that no additional information is required. On the other hand, a disadvantage consists in the calculation taking double the time as the other alternatives described, which use Euler's phi function or the Carmichael $\lambda$ function.

SUMMARY OF THE INVENTION

It is an object of the present invention to provide a concept for determining a result of a modular exponentiation within a cryptosystem, which is secure and efficient.

In accordance with a first aspect, the present invention provides an apparatus for determining a result of a modular exponentiation within a cryptosystem with a first key and a second key, having: a randomization auxiliary number calculator for calculating a randomization auxiliary number on the basis of a product of the first key and the second key less 1; a processor for obtaining a random number and for combining a product of the random number and the randomization auxiliary number with the first or the second key in order to obtain a randomized exponent; and a result calculator for calculating the result of the modular exponentiation using the randomized exponent.

In accordance with a second aspect, the present invention provides an apparatus for determining a result of a modular exponentiation within a cryptosystem with a first key and an accompanying second key using the Chinese remainder theorem, having: a performer for performing a first modular exponentiation using a first partial key derived from the second key in order to obtain a first intermediate result, and for performing a second modular exponentiation using a second partial key derived from the second key in order to obtain a second intermediate result, and a combiner for combining the first and second intermediate results according to the Chinese remainder theorem to obtain the result of the modular exponentiation, wherein the performer has: a randomization auxiliary number calculator for calculating a randomization auxiliary number on the basis of a product of a partial key and the first key less "1"; a processor for obtaining a random number and for combining a product of the random number and the randomization auxiliary number with a partial key to obtain a randomized exponent; and wherein the performer is formed to use the randomized exponent for calculating the first or the second intermediate result.

In accordance with a third aspect, the present invention provides a method of determining a result of a modular exponentiation within a cryptosystem with a first key and a second key, with the steps of: calculating a randomization auxiliary number on the basis of a product of the first key and the second key less 1; obtaining a random number and combining a product of the random number and the randomization auxiliary number with the first or the second key in order to obtain a randomized exponent; and calculating the result of the modular exponentiation using the randomized exponent.

In accordance with a fourth aspect, the present invention provides a method of determining a result of a modular exponentiation within a cryptosystem with a first key and an accompanying second key using the Chinese remainder theorem, with the steps of: performing a first modular exponentiation using a first partial key derived from the second key in order to obtain a first intermediate result, and for performing a second modular exponentiation using a second partial key derived from the second key in order to obtain a second intermediate result, and combining the first and second intermediate results according to the Chinese remainder theorem to obtain the result of the modular exponentiation; wherein the step of performing has the following substeps: calculating a randomization auxiliary number on the basis of a product of a partial key and the first key less "1", obtaining a random number and combining a product of the random number and the randomization auxiliary number with a partial key to obtain a randomized exponent, and wherein the step of performing is further formed to use the randomized exponent for calculating the first or the second intermediate result.

In accordance with a fifth aspect, the present invention provides a computer program with a program code for performing, when the program is executed on a computer, a method of determining a result of a modular exponentiation within a cryptosystem with a first key and a second key, with the steps of: calculating a randomization auxiliary number on the basis of a product of the first key and the second key less 1; obtaining a random number and combining a product of the random number and the randomization auxiliary number with the first or the second key in order to obtain a randomized exponent; and calculating the result of the modular exponentiation using the randomized exponent.

In accordance with a sixth aspect, the present invention provides a computer program with a program code for performing, when the program is executed on a computer, a method of determining a result of a modular exponentiation within a cryptosystem with a first key and an accompanying second key using the Chinese remainder theorem, with the steps of: performing a first modular exponentiation using a first partial key derived from the second key in order to obtain a first intermediate result, and for performing a second modular exponentiation using a second partial key derived from the second key in order to obtain a second intermediate result; and combining the first and second intermediate results according to the Chinese remainder theorem to obtain the result of the modular exponentiation, wherein the step of performing has the following substeps: calculating a randomization auxiliary number on the basis of a product of a partial key and the first key less "1"; and obtaining a random number and combining a product of the random number and the randomization auxiliary number with a partial key to obtain a randomized exponent, wherein the step of performing is further formed to use the randomized exponent for calculating the first or the second intermediate result.

BRIEF DESCRIPTION OF THE DRAWINGS

These and other objects and features of the present invention will become clear from the following description taken in conjunction with the accompanying drawings, in which:

FIG. 1 is a block circuit diagram of the inventive concept with randomization of the exponent without use of the Chinese remainder theorem;

FIG. 2 is a sequence of steps according to a preferred embodiment of the present invention for the concept of FIG. 1;

FIG. 3 is an alternative implementation of the present invention, in which the Chinese remainder theorem is used;

FIG. 4 is a more detailed illustration of the means for modular exponentiation with a first and/or a second partial key;

FIG. 5a is a detailed implementation of the modular exponentiation with the first partial key according to FIG. 3;

FIG. 5b is a detailed implementation of the modular exponentiation with the second partial key;

FIG. 5c is a detailed implementation of the means for combining the results according to the Chinese remainder theorem of FIG. 3; and FIG. 6 is an overview diagram for the explanation of a known signature algorithm and a known verification algorithm.

DESCRIPTION OF THE PREFERRED EMBODIMENTS

The present invention is based on the finding that for the randomization of the exponent the product of public and private keys less the value "1", as e×d−1, is always a multiple of the Carmichael function $\lambda(N)$ and may thus be used for the randomization. It is to be pointed out that there is only knowledge in that the term e×d−1 is a multiple of the Carmichael function. It is, however, not known which multiple the term e×d−1 is. This knowledge is, however, not required for the randomization of the exponent. It is advantageous in the inventive randomization auxiliary number, as the term e×d−1 is referred to in the following, that for the calculation of this term only a priori known quantities are required, namely the public and private keys. No Euler's phi function or Carmichael $\lambda$ function has to be calculated. Instead, only a simple multiplication of the public key and the private key in the case of an application without Chinese remainder theorem, or—with CRT—a simple multiplication between the public key and the first or second private auxiliary keys $d_p$ and $d_q$, respectively, has to be performed to then subtract the value "1" from this value in order to achieve the randomization auxiliary number.

Although it would in principle be possible, particularly in all-purpose computers or in multifunctional crypto CPUs, to calculate Euler's phi function or the Carmichael $\lambda$ function, in special e.g. signature CPUs, as they are for example employed in chip cards, it is not, or only with great effort, possible to calculate such special functions. According to the invention, this advantage is dealt with by using the randomization auxiliary number calculated from the product of the private key and the public key less the value "1" for the randomization.

The inventive concept for determining a result of a modular exponentiation using randomization of the exponent is thus advantageous in that it achieves high accuracy due to the randomization, that it can be implemented without great effort and is suitable in particular for protocols in which Euler's phi function or the Carmichael $\lambda$ function is not made available.

FIG. 1 shows a schematic block diagram of an apparatus for determining a result of a modular exponentiation within a cryptosystem with a first and an accompanying second key. The apparatus includes input means in which cryptographic parameters m, e, d, and N are provided. The input stage is designated with 10 in FIG. 1. Here, m represents the message to be signed, for example. e represents the first key, which is also referred to as public key in the following. d represents the second key of the cryptosystem, which is also referred to as secret key in the following. Finally, N represents the modulus with reference to which the modular exponentiation is to be performed. At this point already, it is to be noted that the modulus N may be formed from a product of the two numbers p and q, as it is known from the RSA algorithm. For the concept illustrated in FIG. 1, these two auxiliary numbers p and q are, however, not required. The entire calculation may take place exclusively using the input parameters m, e, d and N.

Downstream of the input stage 10, means 12 for calculating a randomization auxiliary number on the basis of the product from the first key e and the second key d less the number "1" is illustrated. Preferably, the randomization auxiliary number exactly corresponds to the term e×d−1. Alternatively, also a multiple of this term could be used, however, wherein here it is, however, to be ensured that this multiple of the term e×d−1 also is a multiple of the Carmichael $\lambda$ function at the same time, to be useable as randomization auxiliary number.

Downstream of means 12 for calculating, means 14 for obtaining a random number and for calculating a randomized exponent is disposed, which executes the following equation:

$$d' = d + R \times (e \times d - 1).$$

In other words, means 14 for obtaining combines the product from the random number and the randomization auxiliary number with the exponent d preferably in additive manner. At the output of means 14, then there is a randomized exponent. Using the randomized exponent calculated by means 14, then means 16 for calculating the modular exponentiation works to obtain the result S of the modular exponentiation, which may typically be a digital signature. Finally, an output stage 18 is provided to output the signature in any form, for example graphically, binarily, or in another way.

In the embodiment shown in FIG. 1, only the exponent is randomized. But as will be explained in the following on the basis of FIG. 2, additionally also, apart from the exponents, the message m to be signed or encrypted may be randomized. Referring to the notation in FIG. 2, it is to be pointed out that this already is a register-adapted implementation. For performance of the algorithm shown in FIG. 1 together with the additional randomization of the message m to be signed, the registers R, X, D, m, N', and S are required. In the left column of the sequence of steps of FIG. 2, these registers are listed. In the right column of the sequence of steps of FIG. 2, on the other hand, there is the mathematical operation to be performed in order to write the result of this operation into the register illustrated on the left with reference to the arrow directed to the left.

The algorithm shown in FIG. 2 is illustrated as a sequence of steps in the following, also it may equally well be interpreted as a collection of various means. In an input step 20, the data m, e, d, and N is provided. In a step 21, at first the randomization auxiliary number e×d−1 is calculated and written into the register X. In a step 22, then a random number with a length preferably lying between 16 and 32 bits is selected and written into the register R. In a step 23, then the content of the register X is multiplied by the content of the register R, wherein the result of this multiplication is again written into the register X. In a step 24, the randomization of the exponent is performed, as it is illustrated at 14 in FIG. 1. In particular, this takes place by the content of the register X being added to the second key, i.e. to the private key d, wherein the result of this addition is again written into the register D. In a step 25, again a random number with a length preferably between 16 or 32 bits is chosen and written into the register R. In a step 26, then the content of the register R is multiplied by the modulus N, wherein the message m to be signed is added to the result of this multiplication.

The entire result of this addition is again written into a register for the message to be signed, which is designated with m. The step 26 thus represents the additional randomization of the value to be processed, i.e. the message to be signed, in order to achieve additional security. In a step 27, then again a random number with the length for example between 16 or 32 bits is chosen and written into the register R. In a step 28, then a modulus randomization is performed by multiplying the modulus N by the just-selected random number in the register R. The result of this multiplication is written into a register N'. In a step 29, then modular exponentiation is performed, wherein the content of the register m, which corresponds to the randomized message, is used as basis, wherein the content of the register D containing the randomized exponent is used as exponent, and wherein the content of the register N' containing the randomized modulus is employed as modulus of the modular exponentiation in step 29. The result of this modular exponentiation is written into the register S. In a concluding reduction step 3, then the content of the register S is subjected to modular reduction using the modulus provided in the input step 20, in order to finally obtain the result sought, which is written into the register S. In an output step 31, then the content of the register S is output, which equals the modular exponentiation, which would also be obtained on the basis of the non-randomized parameters provided in the input step 20.

In the embodiment shown in FIG. 2, a total of three randomizations are used, namely the randomization of the modulus using the randomization auxiliary number e×d−1 (step 24), the randomization of the message in step 26, and the randomization of the modulus in step 28. It is to be pointed out that optionally also the randomization of the exponent with the inventive randomization auxiliary number alone, combined with the randomization of the message m to be signed, and/or combined with the randomization of the modulus N may be performed.

Furthermore, it is to be pointed out that the randomized exponent is a greater number than the originally used exponent d (or in principle also e) due to the addition of the term R×(e×d−1) in the block 14 of FIG. 1. But since the keys may already take on great sizes anyway, for example 1024 or 2048 binary digits, it is preferred to take a comparably small number as randomization number R. On the other hand, a too small random number would destroy the effect of the randomization. Hence, it is preferred to use a random number greater than or equal to 8 bits or smaller than or equal to 128 bits for the randomization of the exponent. Preferably, a length of the random number between including 16 and including 32 is used, as it is illustrated in FIG. 2. Furthermore, it is to be pointed out that for the random numbers chosen in the steps 22, 25 and 27 of FIG. 2, either always the same random number may be used, or that different random numbers can be used. If always the same random number is used, this random number only has to be generated once and may then be stored in a random number register of its own. This approach is advantageous in that a random number only has to be generated once. On the other hand, a random number register of its own is required. If on the other hand a random number of its own, which will most likely differ from the random numbers generated in the respective other steps, is generated in each step 22, 25, and 27, no random number register of its own is required, which might perhaps even be attacked. Hence, the latter embodiment is preferred when a sufficiently powerful random number generator is available.

With reference to the individual random numbers chosen in the steps 22, 25, and 27, it is further to be pointed out that they do not necessarily have to have the same length in each step. Regarding a discussion of the length of the random number chosen for the randomization of the exponents in step 22, reference is made to the above discussion. The random numbers chosen in the steps 25 and 27 may be smaller or greater, wherein altogether smaller random numbers contribute to decreasing the computation overhead, but wherein a minimum amount of the random number should be met so as not to jeopardize the concept of the randomization as a whole. The random numbers chosen in the steps 25 and 27 thus should also have a length greater than or equal to 8 bits.

FIG. 3 shows a principle block circuit diagram of the inventive concept, but now using the Chinese remainder theorem CRT. An input stage 100 represents cryptographic input parameters, which now include, however, more input parameters than in the embodiment shown in FIG. 1, since the Chinese remainder theorem is to be applied. Specifically, the message m to be signed, the public key e, a first private partial key $d_p$, a second private partial key $d_q$, the numbers p, q, and the parameter $q_{inv}$ are provided. In FIG. 3, it is illustrated how the numbers $d_p$, $d_q$, and $q_{inv}$ may be calculated from the quantities d, p, and q.

The input stage 100 feeds means 102 for performing a first modular exponentiation (102a), using a first partial key $d_p$ derived from first key d, to obtain a first intermediate result, and for performing a second modular exponentiation (102b), using a second partial key $d_q$ derived from the first key, in order to obtain a second intermediate result. The functionality of means for performing, using the first partial key $d_p$, is designated with 102a in FIG. 3, whereas the functionality of means for performing the modular exponentiation with the second partial key $d_q$ is designated with 102b. The two means 102a and 102b together form means 102 for performing the first and second modular exponentiations, using the respective partial keys $d_p$ and $d_q$. The block 102a provides a first intermediate result SP as output signal. The block 102b provides a second intermediate result $S_q$ as result. In means 104, the two intermediate results $S_p$ and $S_q$ are combined according to the Chinese remainder theorem and in particular preferably according to Garner's algorithm, in order to finally output the result of the modular exponentiation, such as a signature, in form of the parameter S, as it is illustrated by the block 106 in FIG. 3.

Means for performing illustrated at 102 in FIG. 3 is divided in subunits for each block 102a, 102b, wherein these subunits are schematically illustrated in FIG. 4, namely both for the block 102a and for the block 102b. Specifically, the block 102a includes means 110 for calculating the randomization auxiliary number on the basis of the term $e×d_p−1$. By analogy herewith, the block 102b contains means for calculating the randomization auxiliary number on the basis of the term $e×d_q−1$. Downstream of means 110, there is means 112 obtaining a random number and then calculating the randomized exponent, namely either on the basis of the equation $d_p+R×(e×d_p−1)$ for the block 102a or on the basis of the equation $d_q+R×(e×d_q−1)$ for means 102, wherein R is the random number obtained by the block 112 in FIG. 4.

Finally, modular exponentiation is performed in the blocks 102a and 102b, using the randomized exponents in a block 114 to obtain the intermediate results $S_p$ and $S_q$, respectively.

Subsequently, the functionality of the block 102a of means 102 of FIG. 3 will be explained on the basis of FIG. 5a. In a first step 120, the randomization auxiliary number $e×d_p−1$ is calculated and stored into the register X. In a step 122, a random number is chosen and stored in the register R. In a step 124, the content of the register X and the content of the register R are multiplied by each other, wherein the result of this multiplication is again stored in register X. Then, in a step 126, the actual randomization of the exponent, namely the first partial key $d_p$ derived from the private key, is performed, wherein this result is stored in the register D. In a step 128, again a random number is chosen and stored in the register R. In a step 130, now the message is randomized, namely by analogy with the step 126 of FIG. 2, but now instead of the modulus N of FIG. 2 with the first auxiliary modulus p in FIG. 5a. Then, in a step 132, again a random number is chosen and multiplied by the auxiliary modulus p in a step 134. This now randomized auxiliary modulus stored in the register p' is used in a step 136 for the modular exponentiation illustrated in FIG. 5a, step 136. In a concluding step 138, then the intermediate result written into the register $S_p$ in step 136 is reduced with reference to the original auxiliary modulus p to obtain the first intermediate result $S_p$.

In FIG. 5b, the analog steps of the modular exponentiation with a second partial key according to block 102b of FIG. 3 are illustrated, wherein the steps illustrated in FIG. 5b in principle run exactly like the corresponding steps of FIG. 5a, but wherein instead of the first partial key $d_p$ of FIG. 5a the second partial key $d_q$ is taken in FIG. 5b, and wherein instead of the first auxiliary modulus p in FIG. 5a the second auxiliary modulus q is used in FIG. 5b. Moreover, it is pointed out that the random numbers chosen in FIG. 5a and FIG. 5b may be independent from each other. But alternatively the same random number could also be read from a random number register in each corresponding step. In this respect, the same boundary conditions, as they have been explained on the basis of FIG. 2, apply for the random numbers.

FIG. 5c illustrates the implementation executed by the combination means designated with 104 in FIG. 3, to obtain the result from the first intermediate result $S_p$ and the second intermediate result $S_q$ in the form of the signature S.

The inventive concept consists in that randomization of the exponent may in principle—without further input parameters—established from the minimum private RSA dataset consisting of the modulus N, the public key e, and the private key d—when the CRT is not employed. Randomization may thus always be performed, independent of whether a security protocol provides Euler's phi function, a Carmichael λ function, or something similar, or not. The functionality required for the calculation of the randomization auxiliary number in form of multiplication and addition is present on every usual cryptochip, such as in form of a cryptocoprocessor. Moreover, the randomization is performance neutral, apart from the steps for the generation or determination of the random numbers and apart from the slightly grown length of the exponents. In other words, this means no substantial increase of the computation overhead or the computation time takes place, while at the same time a significant extent of security is gained, which is scalable with reference to the length of the random number.

Depending on the conditions, the inventive method for the determination of a result of a modular exponentiation may be implemented in hardware or in software. The implementation may take place on a digital storage medium, in particular a floppy disc or CD with electronically readable control signals capable of cooperating with a programmable computer system so that the corresponding method is executed. In general, the invention thus also consists in a computer program product with a program code stored on a machine-readable carrier for the performance of the inventive method, when the computer program product is executed on a computer. In other words, the invention thus also represents a computer program with a program code for the performance of the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for determining a result of a modular exponentiation within a cryptosystem with a first key and a second key, comprising:
    an input stage for providing the first key and the second key;
    a randomization auxiliary number calculator for calculating a randomization auxiliary number on the basis of a product of the first key and the second key less 1 and for writing the randomization auxiliary number in a randomization auxiliary number register;
    a processor for obtaining a random number and for combining a product of the random number and the randomization auxiliary number with the first or the second key in order to obtain a randomized exponent and for writing the randomized exponent in a randomized exponent register;
    a result calculator for calculating the result of the modular exponentiation using the randomized exponent; and
    an output stage for outputting the result,
    wherein the apparatus is a cryptochip comprising the randomization auxiliary number register and the randomized exponent register.

2. The apparatus of claim 1, further comprising a basis randomizer to randomize a basis of the modular exponentiation to execute the following equation:

$$m'=m+N\times R,$$

wherein m' is the randomized basis, m is the basis before the randomization, N is the modulus of the modular exponentiation, and R is the random number.

3. The apparatus of claim 1, further comprising a modulus randomizer for randomizing the modulus, with the modulus randomizer being operative to execute the following equation:

$$N'=N\times R,$$

wherein N' is the randomized modulus, N is the modulus before the randomization, and R is the random number.

4. The apparatus of claim 3, wherein the result calculator is formed to perform a final reduction according to the following equation:

$$S=S' \bmod N,$$

wherein S is the result of the modular exponentiation after a final reduction, S' is the result of the modular exponentiation using the randomized modulus and the randomized exponents before the final reduction, and N is the modulus before the modulus randomization.

5. The apparatus of claim 1, formed to perform a digital signature, wherein m is a plain text message to be signed, d is a secret key, e is a public key, and N is the modulus.

6. An apparatus for determining a result of a modular exponentiation within a cryptosystem with a first key and an accompanying second key using the Chinese remainder theorem, comprising:
    an input stage for providing the first key and the second key;
    a performer for performing a first modular exponentiation using a first partial key derived from the second key in order to obtain a first intermediate result, and for performing a second modular exponentiation using a second partial key derived from the second key in order to obtain a second intermediate result; and
    a combiner for combining the first and second intermediate results according to the Chinese remainder theorem to obtain the result of the modular exponentiation,
    wherein the performer comprises:
    a randomization auxiliary number calculator for calculating a randomization auxiliary number on the basis of a product of a partial key and the first key less "1" and for writing the randomization auxiliary number in a randomization auxiliary number register; and
    a processor for obtaining a random number and for combining a product of the random number and the randomization auxiliary number with a partial key to obtain a randomized exponent and for writing the randomized exponent in a randomized exponent register,
    wherein the performer is formed to use the randomized exponent for calculating the first or the second intermediate result,
    an output stage for outputting the result,
    wherein the apparatus is a cryptochip comprising the randomization auxiliary number register and the randomized exponent register.

7. The apparatus of claim 6, further comprising a basis randomizer for randomizing a basis of a modular exponentiation using a random number according to the following equation:

$$m'=m+p\times R \text{ or } m'=m+q\times R,$$

wherein m' is a randomized basis, m is a basis before the randomization, p is a first auxiliary modulus, q is a second auxiliary modulus, R is the random number, and p and q are chosen so that a product of p and q yields the modulus of the modular exponentiation.

8. The apparatus of claim 6, wherein the performer for performing the first and second modular exponentiations is formed to perform the modular exponentiations using first and second auxiliary moduli, respectively, wherein the apparatus for determining a result is further formed to include a modulus randomizer formed to satisfy the following equation:

$$p'=p \times R \text{ or } q'=q \times R,$$

wherein p' is a randomized first submodulus, p is the first submodulus before the randomization, R is the random number, q' is a randomized second submodulus, and q is the second submodulus before the randomization.

9. The apparatus of claim 8, further formed to perform a concluding final reduction using the first submodulus or using the second submodulus in order to obtain the first and second intermediate results, before the first and second intermediate results are combined with each other.

10. The apparatus of claim 6, wherein the processor is formed to obtain a random number the length of which lies between 8 and 128 bits.

11. The apparatus of claim 6, wherein the result of the modular exponentiation represents a signature of a message, m is the message before the signing, d is the secret key, e is the public key, and N is the modulus.

12. A method of determining a result of a modular exponentiation within a cryptosystem with a first key and a second key, comprising:
    providing the first key and the second key by an input stage;
    calculating a randomization auxiliary number on the basis of a product of the first key and the second key less 1;
    writing the randomization auxiliary number in a randomization auxiliary number register;
    obtaining a random number and combining a product of the random number and the randomization auxiliary number with the first or the second key in order to obtain a randomized exponent;
    writing the randomized exponent in a randomized exponent register;
    calculating the result of the modular exponentiation using the randomized exponent; and
    providing the result by an output stage,
    wherein the method is performed by a cryptochip comprising the randomization auxiliary number register and the randomized exponent register.

13. A method of determining a result of a modular exponentiation within a cryptosystem with a first key and an accompanying second key using the Chinese remainder theorem, comprising:
    providing the first key and the second key by an input stage;
    performing a first modular exponentiation using a first partial key derived from the second key in order to obtain a first intermediate result, and for performing a second modular exponentiation using a second partial key derived from the second key in order to obtain a second intermediate result; and
    combining the first and second intermediate results according to the Chinese remainder theorem to obtain the result of the modular exponentiation,
    wherein the step of performing comprises the following substeps:
    calculating a randomization auxiliary number on the basis of a product of a partial key and the first key less "1";
    writing the randomization auxiliary number in a randomization auxiliary number register;
    obtaining a random number and combining a product of the random number and the randomization auxiliary number with a partial key to obtain a randomized exponent; and
    writing the randomized exponent in a randomized exponent register,
    wherein the step of performing is further formed to use the randomized exponent for calculating the first or the second intermediate result, and
    wherein the method is performed by a cryptochip comprising the randomization auxiliary number register and the randomized exponent register.

14. A non-transitory digital storage medium having stored thereon a computer program with a program code for performing, when the program is executed on a computer, a method of determining a result of a modular exponentiation within a cryptosystem with a first key and an accompanying second key using the Chinese remainder theorem, comprising:
    performing a first modular exponentiation using a first partial key derived from the second key in order to obtain a first intermediate result, and for performing a second modular exponentiation using a second partial key derived from the second key in order to obtain a second intermediate result; and
    combining the first and second intermediate results according to the Chinese remainder theorem to obtain the result of the modular exponentiation,
    wherein the step of performing comprises the following substeps:
    calculating a randomization auxiliary number on the basis of a product of a partial key and the first key less "1"; and
    obtaining a random number and combining a product of the random number and the randomization auxiliary number with a partial key to obtain a randomized exponent,
    wherein the step of performing is further formed to use the randomized exponent for calculating the first or the second intermediate result.

15. An apparatus for determining a result of a modular exponentiation within a cryptosystem with a first key and a second key, comprising:
    an input stage for providing the first key and the second key;
    a randomization auxiliary number calculating means for calculating a randomization auxiliary number on the basis of a product of the first key and the second key less 1 and for writing the randomization auxiliary number in a randomization auxiliary number register;
    a processing means for obtaining a random number and for combining a product of the random number and the randomization auxiliary number with the first or the second key in order to obtain a randomized exponent and for writing the randomized exponent in a randomized exponent register;
    a result calculating means for calculating the result of the modular exponentiation using the randomized exponent; and
    an output stage for outputting the result,
    wherein the apparatus is a cryptochip comprising the randomization auxiliary number register and the randomized exponent register.

16. The apparatus of claim 15, further comprising a basis randomizing means for randomizing a basis of the modular exponentiation and for executing the following equation:

$$m'=m+N\times R,$$

wherein m' is the randomized basis, m is the basis before the randomization, N is the modulus of the modular exponentiation, and R is the random number.

17. The apparatus of claim 15, further comprising a modulus randomizing means for randomizing the modulus, with the modulus randomizing means being operative to execute the following equation:

$$N'=N\times R,$$

wherein N' is the randomized modulus, N is the modulus before the randomization, and R is the random number.

18. The apparatus of claim 17, wherein the result calculating means performs a final reduction according to the following equation:

$$S=S' \bmod N,$$

wherein S is the result of the modular exponentiation after a final reduction, S' is the result of the modular exponentiation using the randomized modulus and the randomized exponents before the final reduction, and N is the modulus before the modulus randomization.

19. The apparatus of claim 15, formed to perform a digital signature, wherein m is a plain text message to be signed, d is a secret key, e is a public key, and N is the modulus.

* * * * *